Feb. 25, 1969   M. J. REAL, JR., ET AL   3,429,175

SINUSOIDAL LINEAR OSCILLATOR

Filed March 14, 1967

INVENTORS
MACKEY J. REAL, JR.
PAUL M. JEGLUM
BORIS E. BRIGHT
BY Harry A. Herbert Jr.
ATTORNEY Richard J. Killoren
AGENT

United States Patent Office 3,429,175
Patented Feb. 25, 1969

3,429,175
SINUSOIDAL LINEAR OSCILLATOR
Mackey J. Real, Jr., O'Fallon, Ill., Paul M. Jeglum, N.A.F. El Centro, Calif., and Boris E. Bright, Holloman Air Force Base, N. Mex., assignors to the United States of America as represented by the Secretary of the United States Air Force
Filed Mar. 14, 1967, Ser. No. 623,522
U.S. Cl. 73—1    5 Claims
Int. Cl. G01c 25/00

ABSTRACT OF THE DISCLOSURE

A rotor, with a large moment of inertia, is mounted on a torsion bar to obtain sinusoidal oscillations of the rotor. The rotor is connected to a test pallet through cabling to convert the sinusoidal oscillations of the rotor to sinusoidal movement of the test pallet. The test pallet is mounted on guide rails to restrict the motion of the test pallet to a single axis, with the guide rails being aligned with the local gravity vector to eliminate any cross acceleration component due to gravity. A torque is applied to the torsion bar to just balance the losses of the system so that the test pallet motion will be undamped.

---

The invention described herein may be manufactured and used by or for the United States Government for governmental purposes without the payment to us of any royalty thereon.

*Prior art*

In conventional linear oscillators, there is direct coupling between the drive motor and the test pallet. With such devices unwanted drive frequencies and noise are normally introduced into the system.

*Brief description of the invention*

According to this invention, use is made of the properties of a torsion bar and a rotor which has a high moment of inertia. The rotor oscillation is converted through cabling to a sinusoidal movement of a test pallet which is restricted to move along a single axis. The losses of the system are balanced by a torque applied to the torsion bar.

One object of the invention is to provide a precision linear oscillator for testing inertial accelerometers or other such devices wherein the system is substantially free of unwanted drive frequencies, crosstalk and noise normally introduced by direct coupling of the drive motor to the test platform as in a conventional linear oscillator.

Another object of the invention is to provide a linear oscillator which will give very accurately controlled acceleration to test components so as to aid in the extraction of error coefficients.

These and other objects will be more fully understood from the following detailed description taken with the drawing, wherein:

*Description of the preferred embodiment*

Figure 3:
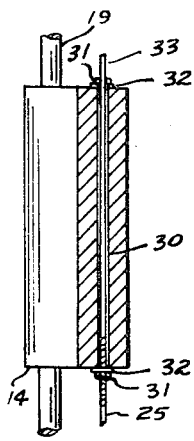
FIG. 3 is an enlarged sectional view of the test pallet taken along the line 3—3 of FIG. 1.
Figure 1:
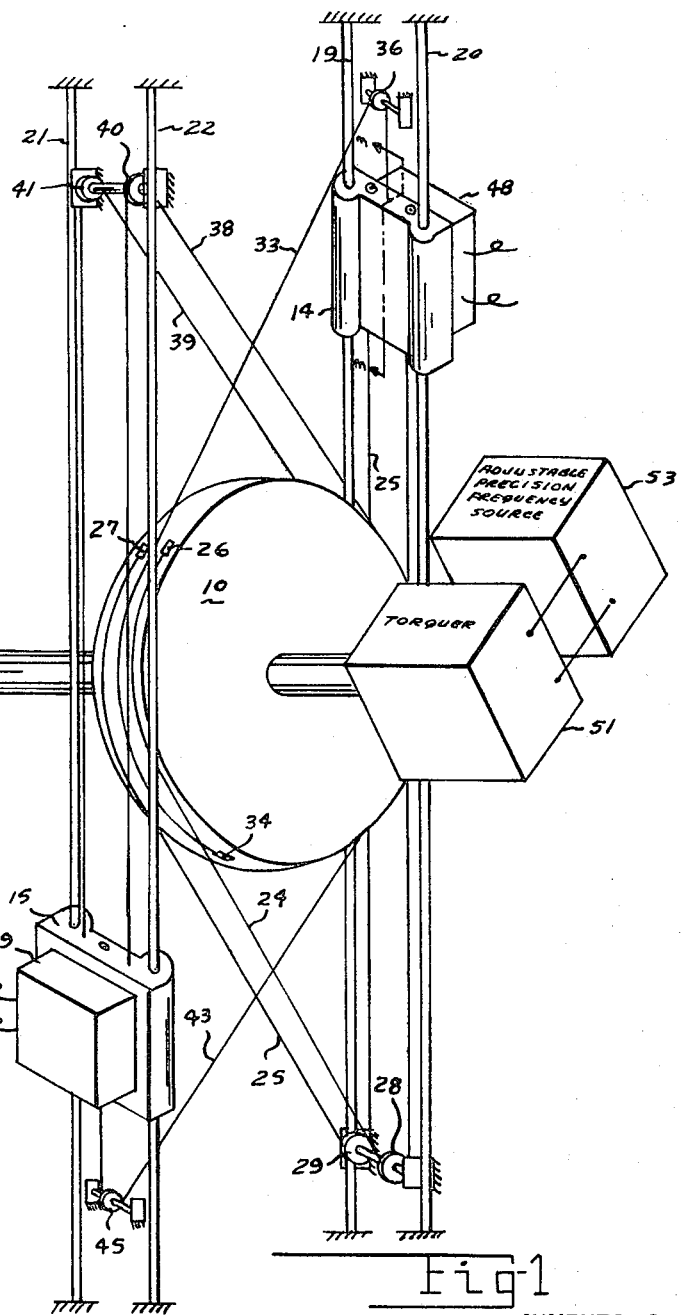
FIG. 1 is an isometric view of a low frequency linear oscillator according to the invention.
Figure 2:
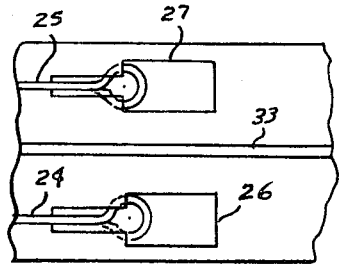
FIG. 2 is an enlarged cutaway view of the rotor of the device of FIG. 1 showing the attachment of the cables thereto.

Reference is now made to FIG. 1 of the drawing which shows a high moment of inertia rotor 10, mounted on a torsion bar 12. The mass and the dimensions of the rotor and the dimensions and characteristics of said torsion bar will be determined by the particular application. A pair of test pallets 14 and 15 are mounted on guide rails 19, 20 and 21, 22, respectively. Any type of low friction bearings such as "Teflon" bearings may be used between the test pallets and guide rails. A pair of cables 24 and 25 connected to the rotor 10 at 26 and 27, respectively, as shown in FIG. 3, pass over pulleys 28 and 29 and are connected to the pallet 14. One means of attachment of the cables to the pallet is shown in FIG. 3 wherein the cable passes through a channel 30 and is held at the other end by a nut 31 and washer 32. This permits adjustment of the tension in the cable and any other adjustments that might be needed. Other means of attachment of the cables to the pallet and rotor than those shown may be used.

A cable 33 is connected to rotor 10 at 34, passes over a pulley 36, and is connected to the other end of pallet 14. A pair of cables 38 and 39 are connected to the rotor 10 in the same manner as cables 24 and 25, pass over pulleys 40 and 41, respectively, and are connected to one side of test pallet 15. A cable 43 is connected to the rotor 10 in the same manner as a cable 33, passes over pulley 45 and is connected to the other side of test pallet 15. The cables used may be any type of pulley cables known in the art; however, to minimize vibrations that might be transmitted to the test pallet, self-damping cables, such as used in parachute cargo extraction systems or actuating cables for control systems in aircraft, are preferred.

A test device 48 is mounted, by any well-known means on test pallet 14. A test device 49 is mounted by any well-known means to test pallet 15. In some uses, the test device on one of the test pallets could be replaced by a weight having the same mass as the test device on the other test pallet. Also one of the test pallets could be replaced by other counterbalance means, if desired. A standard torquer 51 such as Inland Catalog type T1004B, Inland Manufacturing Company, Division of General Motors, Dayton, Ohio, is attached to the one end of torsion bar 12. The torquer is driven from a standard precision frequency 53. An adjustable support 54 is provided at the other end of the torsion bar 12. One type of adjustable support that might be used is the collar 60 slidably supported on two fixed supports 61 and 62 and splined to shaft 12.

In the operation of the device, the apparatus is located so that the guide rails 19, 20, 21 and 22 are aligned with the local gravity vector. Accelerometers or other test instruments are then secured to pallets 14 and 15. Two test pallets are used to provide balanced torque on the inertial rotor 10. The torquer 51 is then energized to apply a torque to the torsion bar 12 at a predetermined frequency near the natural frequency of the mechanical system. The collar 60 can then be adjusted to further tune the mechanical system to the exciting frequency of the torquer. The sinusoidal oscillations of the rotor are then converted to sinusoidal movement of the test pallets 14 and 15 by means of the cables 24, 25, 33, 38, 39 and 43. Then standard accelerometer and gyro test instrumentation is used to record the outputs of the test items for analysis.

There is thus provided a linear oscillator for testing inertial accelerometers and other such devices which will give very accurately controlled acceleration to test components and which is substantially free of unwanted drive frequencies, crosstalk and noise normally introduced in such systems.

While a certain specific embodiment has been described, it is obvious that numerous changes may be made without departing from the general principles and scope of the invention.

We claim:

1. A device for producing linear sinusoidal oscillations, comprising: a rotor, having a predetermined mass; resilient support means for rotationally supporting said rotor; at least one test pallet; cable means passing around said rotor and secured to said rotor and said test pallet for connecting said test pallet to said rotor; means for guiding the movement of said test pallet along a predetermined linear path; means for applying a sinusoidally varying twisting moment to said rotor to thereby provide a sinusoidal oscillation of said rotor whereby a linear sinusoidal oscillation is imparted to said test pallet and means connected to said rotor for counterbalancing the weight of said test pallet.

2. The device as recited in claim 1 wherein said resilient support means is a torsion bar; adjustable means for rigidly supporting one end of said torsion bar against rotation.

3. The device as recited in claim 2 wherein said guiding means is a pair of guider rails; said test pallet being slidably supported on said guide rails.

4. The device as recited in claim 3 including a first pulley located on one side of said rotor and a pair of pulleys on the other side of said rotor; said cable means for connecting the test pallet to said rotor being a first cable connected to said rotor, passing over said first pulley and being connected to one side of said test pallet and a pair of cables connected to said rotor, passing over said pair of pulleys and being connected to the other side of said test pallet.

5. The device as recited in claim 4 wherein said counterbalancing means is a second test pallet connected to said rotor in the same manner as said previously recited test pallet; a second pair of guide rails being located on the opposite side of said rotor from said previously recited guide rails; said second test pallet being slidably supported on said second pair of guide rails.

References Cited

UNITED STATES PATENTS 2,307,967    11/1942    Nosker _____ 73—1
2,930,230    3/1960    Herrmann _____ 73—1

S. CLEMENT SWISHER, *Primary Examiner.*